US008448789B2

(12) United States Patent
Bylander et al.

(10) Patent No.: US 8,448,789 B2
(45) **Date of Patent: *May 28, 2013**

(54) APPARATUS FOR WASHING AND DEWATERING PULP

(75) Inventors: Johan Bylander, Sundsvall (SE); Fredrik Pontén, Sundsvall (SE); Jörgen Lundberg, Sundsvall (SE)

(73) Assignee: Metso Paper, Inc. (FI)

( * ) Notice: Subject to any disclaimer, the term of this patent is extended or adjusted under 35 U.S.C. 154(b) by 439 days.

This patent is subject to a terminal disclaimer.

(21) Appl. No.: 12/747,683

(22) PCT Filed: Dec. 11, 2008

(86) PCT No.: PCT/SE2008/051439

§ 371 (c)(1), (2), (4) Date: Jun. 11, 2010

(87) PCT Pub. No.: WO2009/075641

PCT Pub. Date: Jun. 18, 2009

(65) Prior Publication Data

US 2011/0017646 A1 Jan. 27, 2011

(30) Foreign Application Priority Data

Dec. 13, 2007 (SE) ...................................... 0750008

(51) Int. Cl.
*B01D 33/06* (2006.01)
*D21F 1/06* (2006.01)

(52) U.S. Cl.
USPC ............ 210/386; 162/52; 162/203; 162/258; 210/86; 210/387; 210/402

(58) Field of Classification Search
USPC .............. 210/87, 386, 387, 402, 404; 100/37, 100/74, 121, 131, 132; 68/43; 162/52, 56, 162/60, 120, 232, 252, 258, 289, 203–205, 162/358.1, 358.2, 301–303, 323, 357
See application file for complete search history.

(56) References Cited

U.S. PATENT DOCUMENTS 3,772,144 A 11/1973 Luthi et al.
3,980,518 A 9/1976 Ljung et al.

(Continued)

FOREIGN PATENT DOCUMENTS

EP 1035250 A2 9/2000
EP 1229164 A2 8/2002

(Continued)

OTHER PUBLICATIONS

International Search Report, PCT/SE2008/051439, dated Mar. 10, 2009.

*Primary Examiner* — Joseph Drodge
(74) *Attorney, Agent, or Firm* — Lerner, David, Littenberg, Krumholz & Mentlik, LLP

(57) ABSTRACT

Apparatus for washing and dewatering pump comprising a pair of rotatable press rolls with permeable outer surfaces, a casing comprising a vat in which the rolls are installed, and a feed for feeding the pulp to the gap formed between the vat and the press roll is disclosed. The vat includes a first side vat segment partially enclosing the first press roll and a second side vat segment partially enclosing the second press roll and casing members for each of the vat segments, the first casing member being pivotable about an axis of rotation and between closed and open positions, pulp distribution devices for distributing pulp onto the press rolls, at least one of the pulp distribution devices being mounted on the casing member whereby it is moved away from the press roll together with the casing member when it is opened.

13 Claims, 2 Drawing Sheets

U.S. PATENT DOCUMENTS

| | | | | |
|---|---|---|---|---|
| 5,063,840 | A | 11/1991 | Vote | |
| 5,107,757 | A * | 4/1992 | Ohshita et al. | 100/90 |
| 5,488,900 | A | 2/1996 | Sundqvist | |
| 6,311,849 | B1 | 11/2001 | Sbaschnigg et al. | |
| 6,521,094 | B2 * | 2/2003 | Lamas et al. | 162/323 |
| 6,668,600 | B1 * | 12/2003 | Hansson | 68/43 |
| 8,187,425 | B2 * | 5/2012 | Bylander et al. | 162/232 |
| 2005/0126725 | A1 | 6/2005 | Brottgardh et al. | |

FOREIGN PATENT DOCUMENTS

| | | | |
|---|---|---|---|
| JP | 2002242087 | A | 8/2002 |
| SE | 380300 | B | 11/1975 |
| SE | 501799 | C2 | 5/1995 |
| SE | 512753 | C2 | 5/2000 |
| WO | 0075419 | A1 | 12/2000 |

* cited by examiner

APPARATUS FOR WASHING AND DEWATERING PULP

CROSS-REFERENCE TO RELATED APPLICATIONS

The present application is a national phase entry under 35 U.S.C. §371 of International Application No. PCT/SE2008/051439 filed Dec. 11, 2008, published in English, which claims priority from Swedish Patent Application No. 0750008-5 filed Dec. 13, 2007, all of which are incorporated herein by reference.

FIELD OF THE INVENTION

The present invention relates to apparatus for washing and dewatering pulp, especially cellulose-containing pulp, comprising two rotatable press rolls having a permeable outer surface, between which the pulp is pressed, and a casing comprising a vat in which the press rolls are installed. The vat partly encloses the outer surface of each press roll and the vat comprises a first side vat segment which partly encloses the outer surface of the first press roll and a second side vat segment which partly encloses the outer surface of the second press roll. The casing comprises a first side casing member provided with the first side vat segment, and a second side casing member provided with the second side vat segment.

BACKGROUND OF THE INVENTION

When producing cellulose-based products, a roll press is frequently used for washing and dewatering the cellulose-based pulp. The pulp is passed between two cooperating press rolls installed in the roll press, the press rolls having a perforated outer surface, a so called mantle surface, whereby the outer surface is permeable to liquid pressed out of the pulp, and the pulp is pressed in the roll nip, or the press nip, between the press rolls, whereby liquid is pressed out of the pulp. The roll press also includes one or more washing zones upstream of the press nip. One example of such a roll press is disclosed in U.S. Pat. No. 3,980,518, where the central axes of the press rolls lie in substantially the same horizontal plane, and the pulp passes through the press nip between the press rolls in a vertical direction, from below upwards.

The above-mentioned roll presses comprise a vat in which the two press rolls are installed and partially enclosed. The vat limits accessibility to the press roll, especially if the vat encloses a large portion of the circumference of the perforated outer surface of the press roll. Accessibility to the press roll is, however, necessary for performing maintenance work, cleaning the press roll and the press nip, e.g. clearing plugs and removing pulp jammed on the perforated outer surface or in proximity to the press roll, or for changing press rolls. U.S. Pat. No. 5,063,840 discloses several previously known solutions for providing accessibility to the press rolls and the press nip. In one known solution, the vat is provided with a number of small-sized vat access doors. In another known solution, a bottom door is provided, and the nip wedge, which converges towards the press nip, is an integral part of the bottom door. The bottom door is supported by a hoist cylinder and is movable in a vertical direction. However, the access provided by these previously known solutions is limited, and these doors do not provide sufficient working room for clearing plugs. To overcome these drawbacks, U.S. Pat. No. 5,063,840 suggests a solution where the vat is equipped with a bottom door having a nip wedge as an integral part, which bottom door is pivotally mounted by means of a hinge, whereby the accessibility is increased.

The use of a vat having pivotable vat segments is also disclosed in U.S. Pat. No. 6,311,849 which describes apparatus for dewatering and washing pulp, comprising two press rolls, between which the pulp is passed, the axes of rotation of the press rolls lying in a horizontal plane. The vat of this apparatus comprises two upper pivotable vat segments which can be folded upwards for providing better accessibility when performing maintenance work, especially when changing rolls. In this apparatus, the pulp is distributed on the press roll at the lowest position of the circumference of the outer surface.

Further, European Patent No. 1,035,250 describes apparatus for washing and dewatering pulp comprising two filter drums installed in a vat and arranged to rotate in opposite directions to create a press nip. The filter drums are installed in a vat which comprises two pivotable upper vat segments for providing access to the filter drums. A gap is formed between the vat and the outer surface of the filter drums, in which gap the pulp is fed while being pressed and washed.

However, there are still further installations and arrangements associated with the roll press, especially stationary external equipment adjacent to the roll press, which are bulky and impair accessibility when performing maintenance work, especially when making inspections, changing press rolls, removing plugs, and cleaning the perforated outer surface or the region in proximity to the outer surface of the press roll, or the press nip.

One object of the present invention is thus to provide an apparatus for washing and dewatering pulp which provides an improved accessibility when performing maintenance work.

SUMMARY OF THE INVENTION

In accordance with the present invention, this and other objections have now been realized by the invention of apparatus for washing and dewatering pulp comprising first and second rotatable press rolls having permeable outer surfaces, a casing comprising a vat in which the first and second rotatable press rolls are installed, thereby forming a gap between the vat and the permeable outer surfaces of the first and second rotatable press rolls, the first and second rotatable press rolls being juxtaposed with each other to define a press nip therebetween in which the pulp is pressed, feed means for feeding the pulp to the gap in the direction of rotation of the first and second rotatable press rolls towards the press nip, the vat partially enclosing the permeable outer surfaces of the first and second rotatable press rolls and comprising a first side vat segment partially enclosing the permeable outer surface of the first rotatable press roll and a second side vat segment partially enclosing the permeable outer surface of the second rotatable press roll, the casing comprising a first side casing member including the first side vat segment and a second side casing member including the second side vat segment, the first side casing member being pivotable about an axis of rotation and movable between a closed position and an open position for providing access to the first rotatable press roll in the open position, a first pulp distribution device for distributing pulp onto the first rotatable press roll and a second pulp distribution device for distributing pulp onto the second rotatable press roll, at least the first pulp distribution device being mounted on the first side casing member whereby the first pulp distribution device is moved away from the first rotatable press roll together with the first side casing member when the first side casing member is moved from its closed position to its open position. In a preferred embodiment, the second side casing member is pivotable about an axis of rotation and movable between a closed position and an open position for providing access to the second rotatable press roll in the open position, and the second pulp distribution device being mounted on the second side casing member whereby the second pulp distribution device is moved away from the second rotatable press roll together with the second side casing member when the second side casing member is moved from the closed position to the open position.

In accordance with one embodiment of the apparatus of the present invention, the pulp distribution device comprises a forming unit for forming the pulp prior to distribution of the pulp to the gap.

In accordance with another embodiment of the apparatus of the present invention, the pulp distribution device comprises a pulp distribution screw.

In accordance with another embodiment of the apparatus of the present invention, the apparatus includes an inlet for receiving the pulp, at least one first flow channel for transporting the pulp from the inlet to the first pulp distribution device, and at least one second flow channel for transporting the pulp from the inlet to the second pulp distribution device. Preferably, the apparatus comprises a stationary base unit positioned substantially below the first and second rotatable press rolls, the inlet being located in the stationary base unit. In a preferred embodiment, the inlet comprises outlets for each of the at least one first and second flow channels, the outlets being located in the base unit and being connected to each of the respective at least one first and second flow channels when the first side casing member is in its closed position and sealing means for sealing the connection between the outlets and the at least one of the first and second flow channels. In a most preferred embodiment, the apparatus includes a flow meter for measuring the flow of the pulp in the at least one of the first and second flow channels, the outlets comprising valve means for controlling the flow of the pulp through the at least one of the first and second flow channels, and control means for controlling the valve means based on the measurement of the flow meter.

In accordance with one embodiment of the apparatus of the present invention, the first side casing member is pivotally attached to the base unit.

In accordance with another embodiment of the apparatus of the present invention, the first side casing member comprises a variety of flow channels distributed along the longitudinal extension of the first and second rotatable press rolls.

In accordance with a preferred embodiment, the inlet comprises a distribution channel extending along the longitudinal extension of at least one of the first and second rotatable press rolls for distributing the pulp to each of the plurality of flow channels.

In accordance with another embodiment of the apparatus of the present invention, the vat comprises a central vat segment partially enclosing the permeable outer surfaces of the first and second rotatable press rolls between the press nip and the first and second side vat segments. In a preferred embodiment, the central vat segment is movable in a substantially vertical direction in relation to the first and second rotatable press rolls.

In prior art roll presses, the pulp distribution device is stationarily mounted adjacent to the press roll, and when the pivotable side casing member is in an opened position, the stationary pulp distribution device limits accessibility when performing maintenance work, such as inspection, the exchange of press rolls, removal of plugs, and the cleaning the permeable outer surface or the region in proximity to the outer surface of the press roll, or the press nip. By mounting the pulp distribution device on the side casing member, the pulp distribution device is automatically moved away from the press roll when opening the side casing member, whereby improved accessibility to the different parts of the apparatus is provided, a larger portion of the outer surface of the first press roll is uncovered when the side casing member is opened, and the above-mentioned maintenance work is radically facilitated.

Advantageously, the axes of rotation of the press rolls are in substantially the same horizontal plane.

According to an advantageous embodiment of the apparatus according to the present invention, the apparatus comprises an inlet device for receiving pulp for the apparatus, at least one flow channel for transporting pulp from the inlet device to the first pulp distribution device mounted to the first side casing member, and at least one flow channel for transporting pulp from the inlet device to the second pulp distribution device is mounted to the second side casing member.

In this manner, the amount of stationary pipes of the external pulp feeding system associated with prior art apparatus, which provides the apparatus with pulp, and surrounds the apparatus and thereby limits access to the press rolls, is reduced, and the bulkiness of the external stationary pulp feeding system surrounding the apparatus is consequently reduced. Most particularly, the external stationary pipes connected to each pulp distribution device can be excluded. By this reduction of the external stationary pipe arrangement, accessibility when performing maintenance work of the above-mentioned types is further improved. When installing a prior art roll press, the external pipe arrangement for feeding pulp to the apparatus is mounted on site where the plant is located, and the pipe arrangement is often custom-made to be adapted to the environmental conditions at the plant. This installation work is time consuming and generates costs. By integrating the arrangement for transporting pulp from the inlet device to the pulp distribution device in the pivotable side casing member, the amount of work for mounting the external pipe arrangement is minimized, and time and money is saved.

Further, by providing the apparatus with one inlet device which distributes pulp to all flow channels, the number of connection points of the apparatus to the external pulp supply can be reduced, since only the inlet device needs to be connected to the external pulp supply, instead of connecting each pulp distribution device to the pulp supply, which facilitates installation on site. Advantageously, the inlet device is provided with only one inlet for connection to the external pulp supply. Thus, the present invention also contributes to standardization with regard to the plant and the pulp supply system, which facilitates installation of the apparatus. Advantageously, the apparatus comprises a stationary base unit positioned substantially below the first and second press rolls, which base unit houses the inlet device.

According to an advantageous embodiment of the apparatus according to the present invention, the inlet device comprises outlet means for each flow channel, which outlet means is located in the base unit and is connectable to the flow channel when the side casing member is in a closed and operating position, and the apparatus comprises sealing means for sealing the passage, from the outlet means to the flow channel, between the outlet means and the flow channel. In this manner, a leakproof path for the pulp from the inlet device to the pulp distribution device is provided, although the inlet device is stationary and the pulp from the inlet device to the pulp distribution device is guided by means of the movable side casing member through the flow channel.

According to a further advantageous embodiment of the apparatus according to the present invention, the apparatus comprises a flow meter for measuring the flow of pulp in the flow channel, the outlet means comprises valve means for controlling the flow of pulp to the flow channel, and the apparatus comprises a control device for controlling the valve means based on the input of the flow meter. In this manner, individual flow control of the pulp flow of each flow channel is provided, which is especially advantageous when the side casing member comprises several flow channels distributed one after the other along the longitudinal extension of the press roll, which is an advantageous embodiment of the apparatus according to the present invention.

Further advantageous embodiments of the apparatus according to the present invention emerge from the detailed description of preferred embodiments.

BRIEF DESCRIPTION OF THE DRAWINGS

The present invention will now be described, for exemplary purposes, in more detail by reference to the following detailed description, which refers to the enclosed drawings, in which.

DETAILED DESCRIPTION

Figure 1:
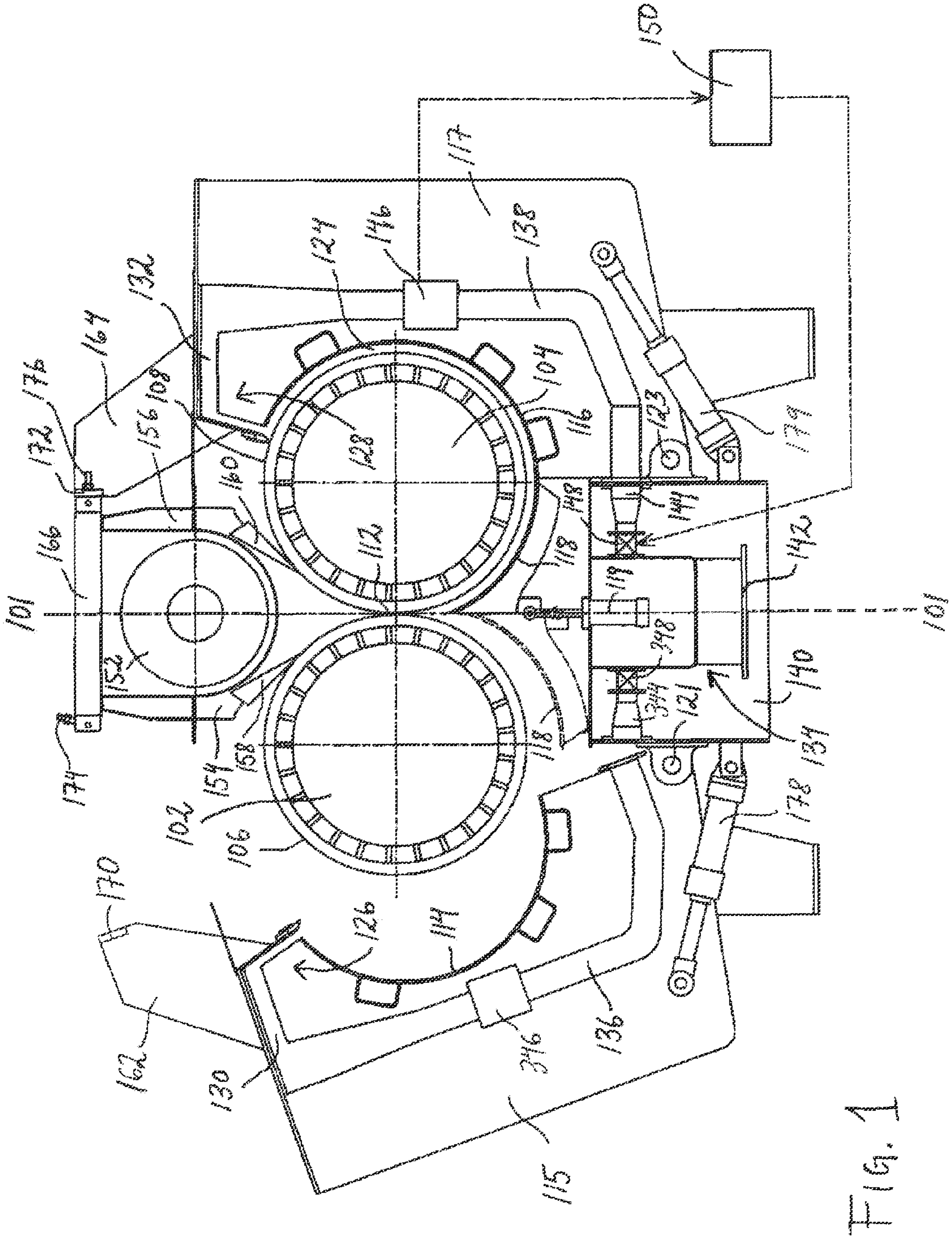
FIG. 1 is a side, elevational, schematic view of an embodiment of the apparatus according to the present invention.

FIG. 1 shows an embodiment of the apparatus for washing and dewatering cellulose-containing pulp according to the present invention. The apparatus has a substantially symmetrical configuration with regard to a symmetry plane 101, and in FIG. 1, the left side of the apparatus, i.e. to the left of the symmetry plane 101, illustrates the apparatus in an opened position, whereas the right side of the apparatus, i.e. to the right of the symmetry plane 101, illustrates the apparatus in a closed and operating position. The apparatus comprises a first rotatable press roll 102 on the left side of the apparatus and a second rotatable press roll 104 on the right side of the apparatus, each press roll, 102 and 104, having a permeable outer surface, 106 and 108. The outer surface, 106 and 108, is perforated, i.e. provided with apertures, whereby the outer surface, 106 and 108, is permeable to filtrate pressed out of the pulp. The shape of the apertures is normally circular, but any shape is possible. The press rolls, 102 and 104, comprise a number of filtrate channels radially inwards of the outer surface, 106 and 108, to lead evacuated filtrate away. The two press rolls defines a press nip 112 between them, in which press nip the pulp is pressed, and are arranged to rotate in opposite directions, the left press roll 102 being arranged to rotate in counter-clockwise direction and the right press roll 104 being arranged to rotate in a clockwise direction. In this embodiment, the axes of rotation of the press rolls, 102 and 104, are in substantially the same horizontal plane, and the apparatus is arranged to feed the pulp through the press nip 112 in a substantially vertical direction from below upwards. However, other positions of the press rolls 102, 104 in relation to each other are possible, and the pulp can be fed through the press nip 112 in other directions. The press rolls, 102 and 104, are adjustable in relation to each other, whereby the press nip 112 is adjustable.

The apparatus comprises a casing which includes a vat, 114, 116, and 118, in which the press rolls, 102 and 104, are installed, the vat, 114, 116, and 118, partly enclosing the outer surface, 106 and 108, of each press roll, 102 and 104, whereby a gap 124 for each press roll, 102 and 104, is defined, limited by the vat, 114, 116, and 118, and the outer surface, 106 and 108, of the respective press, roll 102 and 104. The vat, 114, 116, and 118, comprises a first side vat segment 114 which partly encloses the outer surface 106 of the first press roll 102, and a second side vat segment 116 which partly encloses the outer surface 108 of the second press roll 104.

The casing comprises a first side casing member 115 which extends between the ends of the first press roll 102 and to which the first side vat segment 114 is mounted, and a second side casing member 117 which extends between the ends of the second press roll 104 and to which the second side vat segment 116 is mounted. The side vat segment, 114 and 116, can be mounted to the side casing member, 115 and 117, in different ways, or the side vat segment, 114 and 116, can be integrally formed with its side casing member, 115 and 117. The side casing members, 115 and 117, together with their side vat segments, 114 and 116, are pivotable about an axle, 121 and 123, forming a rotation axis, 121 and 123, and movable between a closed position and an opened position for providing access to the press rolls, 102 and 104. In FIG. 1, on the left side of the apparatus, the first side casing member 115 is in an opened position, whereby access to the press roll 102 is provided, whereas on the right side of the apparatus, the second side casing member 117 is in a closed and operating position.

Further, the vat, 114, 116, and 118, comprises a central vat segment 118 partly enclosing the outer surface, 106 and 108, of the press rolls, 102 and 104, between the press nip 112 and the side vat segments, 114 and 116. The central vat segment 118 is movable in a substantially vertical direction for providing additional accessibility to the region in proximity to the press nip 112. In FIG. 1, on the left side of the apparatus, the central vat segment 118 is shown in an opened position, whereas on the right side of the apparatus, the central vat segment 118 is shown in a closed and operating position.

As mentioned above, a gap 124 is formed between the vat, 114, 116, and 118, and the outer surface, 106 and 108, of the press rolls, 102 and 104. In FIG. 1, only the right side of the apparatus illustrated the apparatus in a closed and operating position, and thus, only the gap 124 with regard to the second press roll 104 and the vat, 116 and 118, is shown, whereas the gap with regard to the first press roll 102 and the vat, 114 and 118, is not present in FIG. 1. However, when the left side of the apparatus is in a corresponding closed and operating position, a corresponding gap is provided between the first press roll 102 and the vat, 114 and 118.

The apparatus comprises a first pulp distribution device 126 for distributing pulp on the first press roll 102 and a second pulp distribution device 128 for distributing pulp on the second press roll 104. The pulp distribution devices, 126 and 128, are arranged to distribute pulp to the gap 124 along the whole length of each press roll, 102 and 104. The pulp distributed on the outer surface, 106 and 108, of the press roll, 102 and 104, forms a mat on the press rolls, 102 and 104. From the pulp distribution devices, 126 and 128, to the press nip 112, the pulp is fed in the gap 124 in the direction of rotation of the press rolls, 102 and 104, while being pressed, or pressed and washed.

The first pulp distribution device 126 is mounted on the first side casing member 115, and the second pulp distribution device 128 is mounted on the second side casing member 117, whereby each pulp distribution device, 126 and 128, is moved away from the respective press roll, 102 and 104, when its side casing member, 115 and 117, is opened and moved away from the respective press roll, 102 and 104, providing an improved accessibility. In this manner, the pulp distribution device, 126 and 128, comprise a forming unit, 130 and 132, for forming the pulp prior to distribution on the press roll, 102 and 104. However, other kinds of pulp distribution devices are possible, such as pulp distribution screws etc. The pulp distribution device, 126 and 128, can also comprise several separate pulp distribution units distributed one after the other along the longitudinal extension of the press roll, 102 and 104.

Further, the apparatus is provided with an inlet device 134 for receiving pulp to the apparatus, and several flow channels, 136 and 138, for transporting pulp from the inlet device 134 to the pulp distribution devices, 126 and 128, which flow channels, 136 and 138, are mounted to and integrated with the side casing members, 115 and 117. In this manner, the flow channels are in the form of pipes having a substantially circular cross-section, however, other designs are possible. The inlet device 134 is housed in a stationary base unit 140 positioned substantially below the first and second press rolls, 102 and 104. The inlet device includes an inlet 142 for connection to an external pulp supply, and an outlet means, 344 and 144, for each flow channel, 136 and 138, which outlet means, 344 and 144, is located in the base unit 140 and is connectable to its flow channel 136 and 138, when the side casing member, 115 and 117, is in a closed position. The apparatus has sealing means for sealing the passage, from the outlet means, 344 and 144, to the flow channel, 136 and 138, between the outlet means, 344 and 144, and the flow channel, 136 and 138. The apparatus is provided with a flow meter, 346 and 146, for measuring the flow rate of the pulp flow in the flow channel, 136 and 138, and the outlet means, 344 and 144, comprises a valve, 348 and 148, for controlling the flow of pulp to the flow channel, 136 and 138. The apparatus comprises a control device 150 for controlling the valve, 348 and 148, based on the input of the flow meter, 346 and 146. Further, each side casing member 115, 117 is pivotally attached to the base unit 140, and each side casing member, 115 and 117, is also connected to the base unit 140 via a respective hydraulic cylinder, 178 179, for controlling the movement of the respective side casing member, 115 and 117. The central vat segment 118 is also movably attached to the base unit 140 through a hydraulic cylinder 119 for controlling the movement of the central vat segment 118.

The apparatus also includes a pulp transport screw 152, which for example can be in the form of a pulp disintegrating screw or a shredder screw, towards which the pulp which has been pressed in the press nip 112 is conveyed. The pulp transport screw 152 extends parallelly to the longitudinal axes of the press rolls, 102 and 104, and is arranged to disintegrate the pulp and transport the pulp axially away from the press for further processing. Each press roll, 102 and 104, is provided with a respective doctor bar, 154 and 156, and each doctor bar, 154 and 156, is provided at the bottom thereof with a respective doctor blade, 158 and 160, for scraping the outer surface, 106 and 108, of the respective press roll, 102 and 104.

The apparatus comprises two sets of arms, 162 and 164, (only one set shown in FIG. 1). Each set comprising a first arm 162 and a second arm 164, where the first side casing member 115 is provided with the first arm 162 and the second side casing member 117 is provided with the second arm 164. Each arm 162, 164 is provided with a locking means, 170 and 172, in the form of a recess, adapted to be detachably attached to a complementary locking means, 174 and 176, in the form of a bolt, for locking the side casing member, 115 and 117, in its closed position. The complementary locking means, 174 and 176, are pivotally anchored to a stationary central member 166 of the apparatus, which central member 166 is positioned above the press rolls, 102 and 104. The stationary central member 166 is positioned above the pulp transport screw 152. Alternatively, the attachment members, 162 and 164, are directly attachable to each other.

Figure 2:
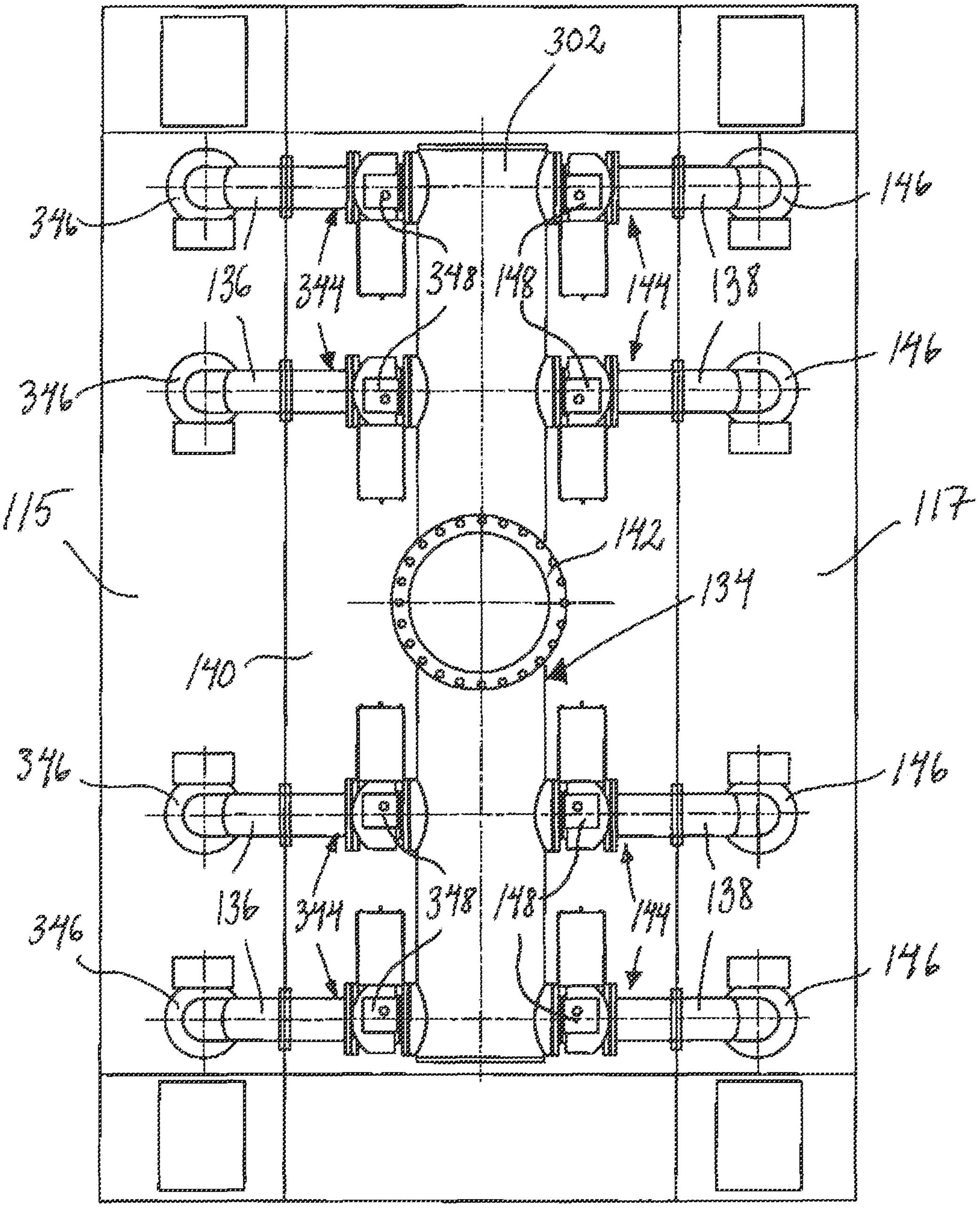
FIG. 2 is a side, elevational, schematic view of the embodiment of FIG. 1.

FIG. 2 is a bottom view of the embodiment of FIG. 1. Each side casing member, 115 and 117, comprises several flow channels, 136 and 138, distributed one after the other along the longitudinal extension of the press roll, 102 and 104. Each flow channel, 136 and 138, is connected to the inlet device 134 by means of its own outlet means, 144 and 344, included in the inlet device 134. Each outlet means, 144 and 344, comprises the valve, 148 and 348, for controlling the flow of pulp to the flow channel, 136 and 138, and each flow channel, 136 and 138, is provided with flow meter, 146 and 346. Further, the inlet device 134 comprises a distribution channel 302, which extends along the longitudinal extension of at least one of the press rolls, 102 and 104, for distributing pulp to every flow channel, 136 and 138, by means of the outlet means, 144 and 344. The inlet 142 of the inlet device 134 for connection to an external pulp supply is centrally positioned between the ends of the distribution channel 302.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Apparatus for washing and dewatering pulp comprising first and second rotatable press rolls having permeable outer surfaces, a casing comprising a vat in which said first and second rotatable press rolls are installed, thereby forming a gap between said vat and said permeable outer surfaces of said first and second rotatable press rolls, said first and second rotatable press rolls being juxtaposed with each other to define a press nip therebetween in which said pulp is pressed, feed means for feeding said pulp to said gap in the direction of rotation of said first and second rotatable press rolls towards said press nip, said vat partially enclosing said permeable outer surfaces of said first and second rotatable press rolls and comprising a first side vat segment partially enclosing said permeable outer surface of said first rotatable press roll and a second side vat segment partially enclosing said permeable outer surface of said second rotatable press roll, said casing comprising a first side casing member including said first side vat segment and a second side casing member including said second side vat segment, said first side casing member being pivotable about an axis of rotation and movable between a closed position and an open position for providing access to said first rotatable press roll in said open position, a first pulp distribution device for distributing pulp onto said first rotatable press roll and a second pulp distribution device for distributing pulp onto said second rotatable press roll, at least said first pulp distribution device being mounted on said first side casing member whereby said first pulp distribution device is moved away from said first rotatable press roll together with said first side casing member when said first side casing member is moved from its closed position to its open position.

2. Apparatus according to claim 1 wherein said second side casing member is pivotable about an axis of rotation and movable between a closed position and an open position for providing access to said second rotatable press roll in said open position, and said second pulp distribution device being mounted on said second side casing member whereby said second pulp distribution device is moved from said second rotatable press roll together with said second side casing member when said second side casing member is moved from said closed position to its open position.

3. Apparatus according to claim 1 wherein said pulp distribution device comprises a forming unit for forming said pulp prior to distribution of said pulp to said gap.

4. Apparatus according to claim 1 wherein said pulp distribution device comprises a pulp distribution screw.

5. Apparatus according to claim 1 including an inlet for receiving said pulp, at least one first flow channel mounted on said first side casing member for transporting said pulp from said inlet to said first pulp distribution device, and at least one second flow channel mounted on said second side casing member for transporting said pulp from said inlet to said second pulp distribution device.

6. Apparatus according to claim 5 comprising a stationary base unit positioned substantially below said first and second rotatable press rolls, said inlet being located in said stationary base unit.

7. Apparatus according to claim 6 wherein said inlet comprises outlets for each of said at least one first and second flow channels, said outlets being located in said base unit and being connected to each of said respective at least one first and second flow channels when said first side casing member is in its closed position and sealing means for sealing the connection between said outlets and said at least one of said first and second flow channels.

8. Apparatus according to claim 7 including a flow meter for measuring the flow of said pulp in said at least one of said first and second flow channels, said outlets comprising valve means for controlling the flow of said pulp through said at least one of said first and second flow channels, and control means for controlling said valve means based on the measurement of said flow meter.

9. Apparatus according to claim 6 wherein said first side casing member is pivotally attached to said base unit.

10. Apparatus according to claim 5 wherein said first side casing member comprises a variety of flow channels distributed along the longitudinal extension of said first and second rotatable press rolls.

11. Apparatus according to claim 10 wherein said inlet comprises a distribution channel extending along the longitudinal extension of at least one of said first and second rotatable press rolls for distributing said pulp to each of said plurality of flow channels.

12. Apparatus according to claim 1 wherein said vat comprises a central vat segment partially enclosing said permeable outer surfaces of said first and second rotatable press rolls between said press nip and said first and second side vat segments.

13. Apparatus according to claim 12 wherein said central vat segment is movable in a substantially vertical direction in relation to said first and second rotatable press rolls.

* * * * *